M. OJALA.
HARROW.
APPLICATION FILED FEB. 18, 1915.

1,184,768.

Patented May 30, 1916.
6 SHEETS—SHEET 1.

WITNESSES
Emil E. Hallenberg
Paul A. Niersen

INVENTOR.
M. Ojala
BY H.J. Sanders
Atty.

M. OJALA.
HARROW.
APPLICATION FILED FEB. 18, 1915.

1,184,768.

Patented May 30, 1916.
6 SHEETS—SHEET 3.

WITNESSES
Emil E. Hallenberg
Paul A. Niemen

INVENTOR
M. Ojala
By H. J. Sanders
Atty.

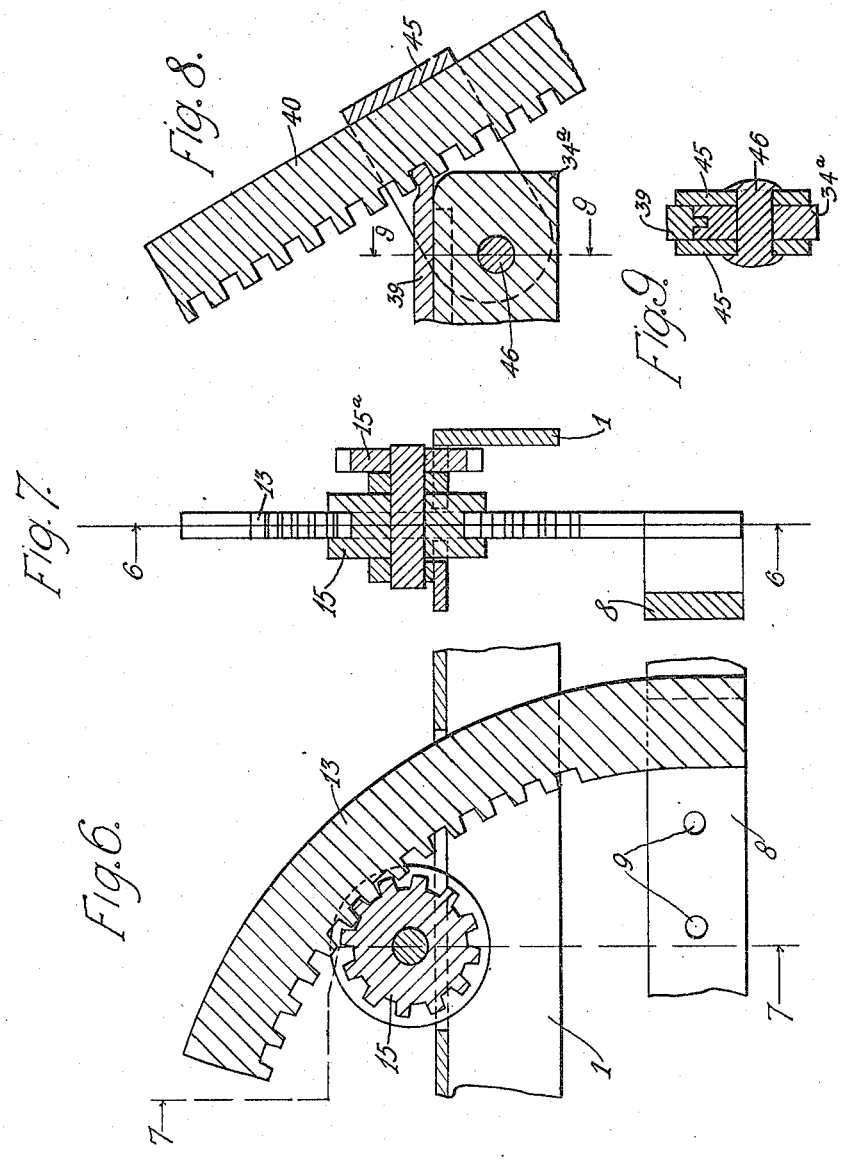

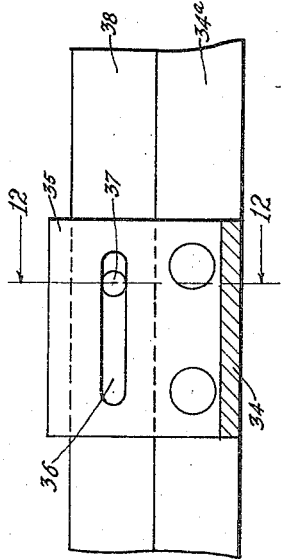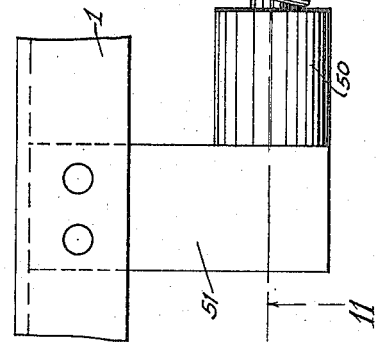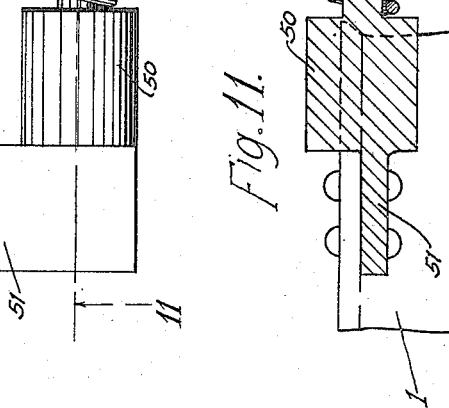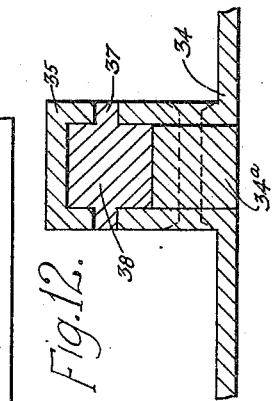

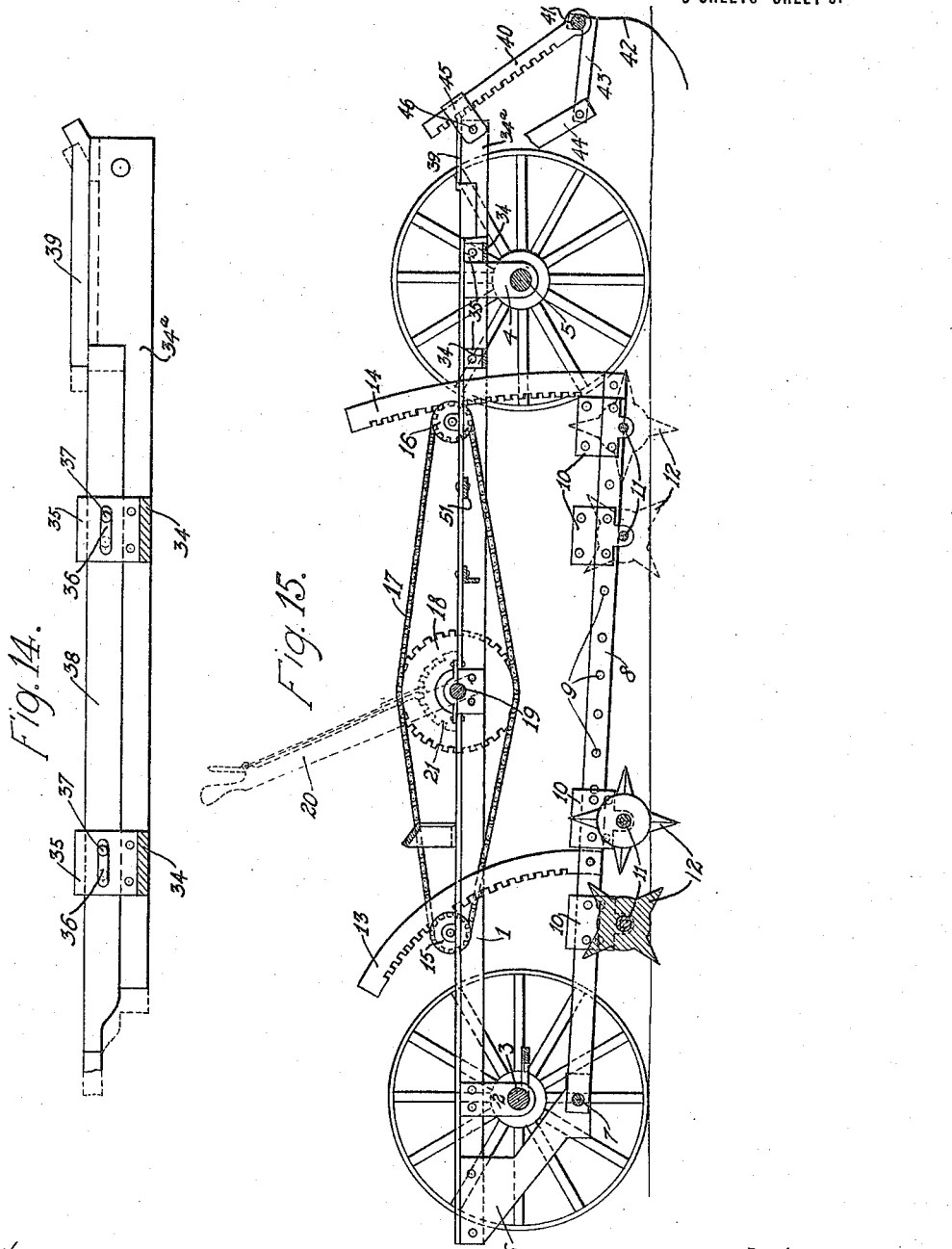

UNITED STATES PATENT OFFICE.

MATTI OJALA, OF ASTORIA, OREGON.

HARROW.

1,184,768.  Specification of Letters Patent.  Patented May 30, 1916.

Application filed February 18, 1915. Serial No. 9,092.

*To all whom it may concern:*

Be it known that I, MATTI OJALA, a citizen of Finland, residing at Astoria, in the county of Clatsop and State of Oregon, have invented certain new and useful Improvements in Harrows, of which the following is a specification.

This invention relates to improvements in harrows and its object is to provide a machine of this class provided with a plurality of rotary blades for cutting or harrowing the soil and with a rake or drag for further pulverizing the soil, disintegrating weeds, grasses and the like; novel means are provided for adjusting the rotary blades and for retaining them releasably in adjusted position. Novel means are also provided for adjusting the rake and for retaining the same releasably in adjusted position.

With the foregoing and other objects in view the invention consists in the combination and arrangement of parts to be hereinafter fully described in the following specification, pointed out in the claims and illustrated in the accompanying drawings which form a part of said specification and in which—

Figure 1:
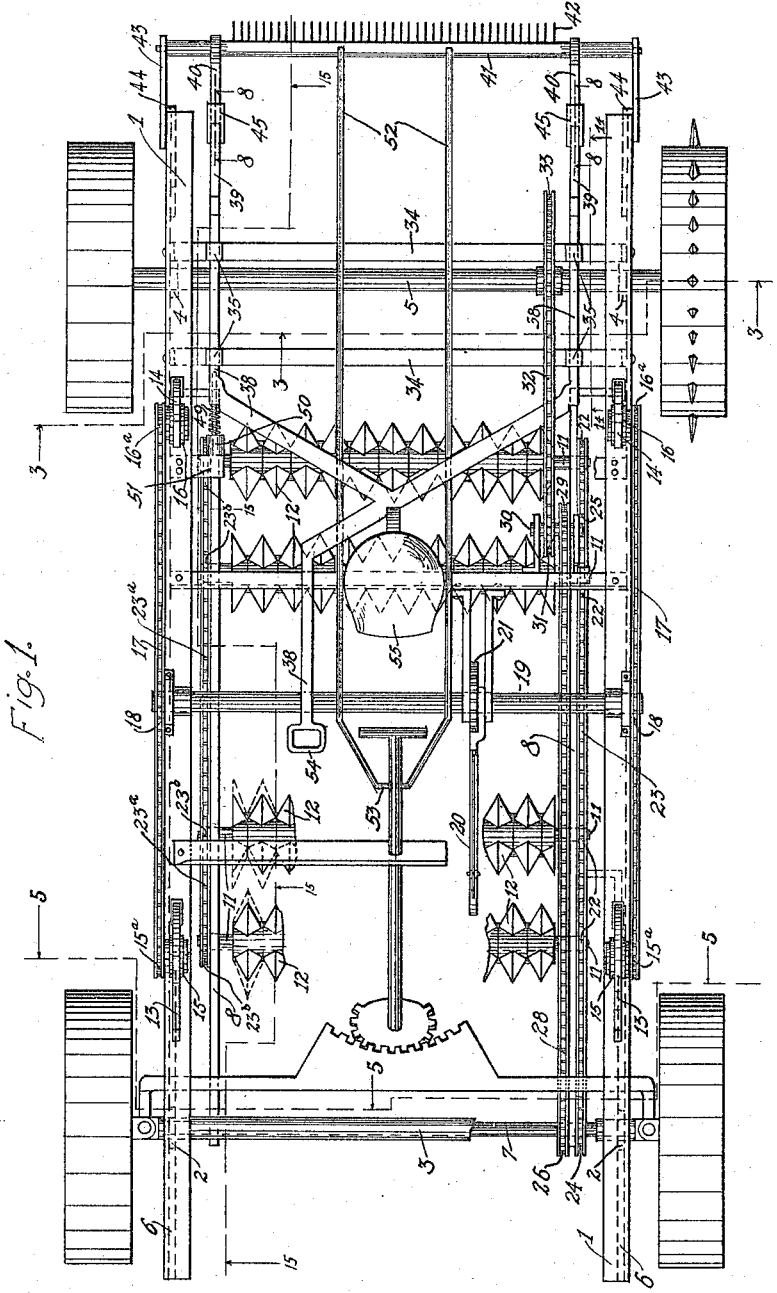
Figure 2:
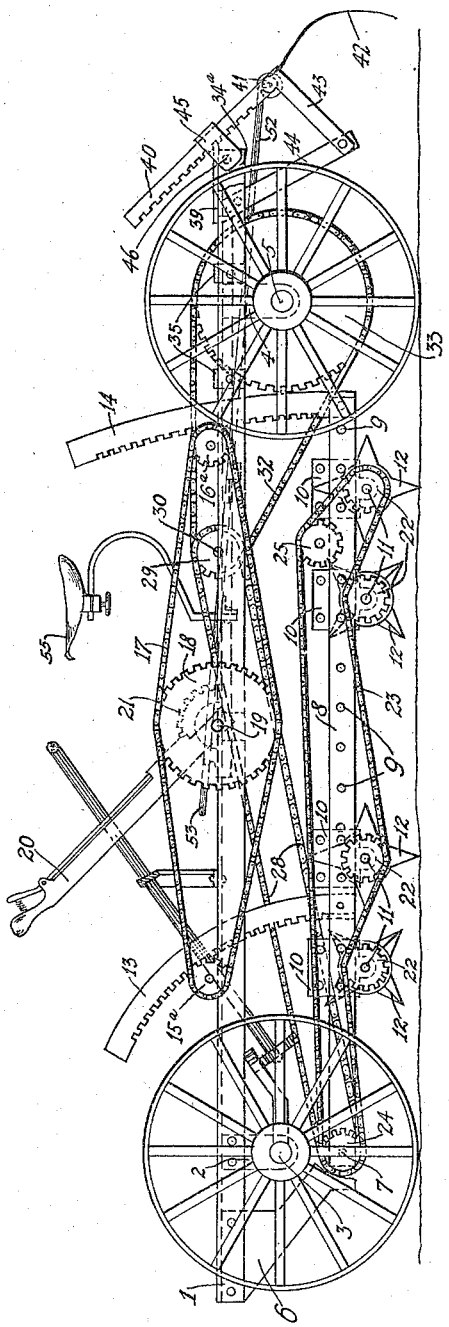
Figure 3:
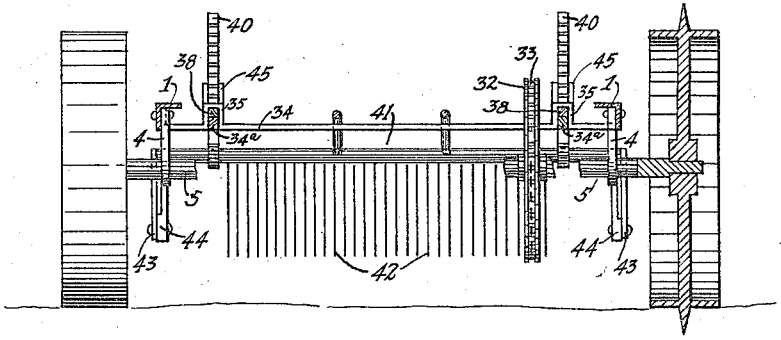
Figure 4:
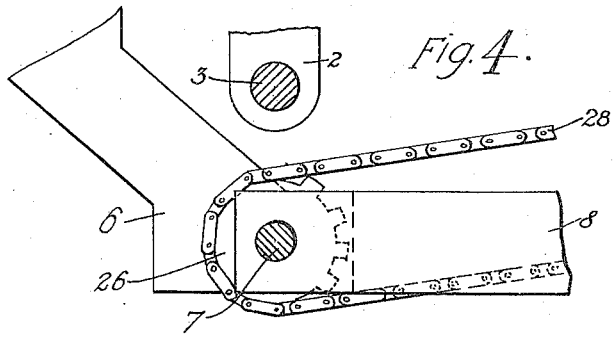
Figure 5:
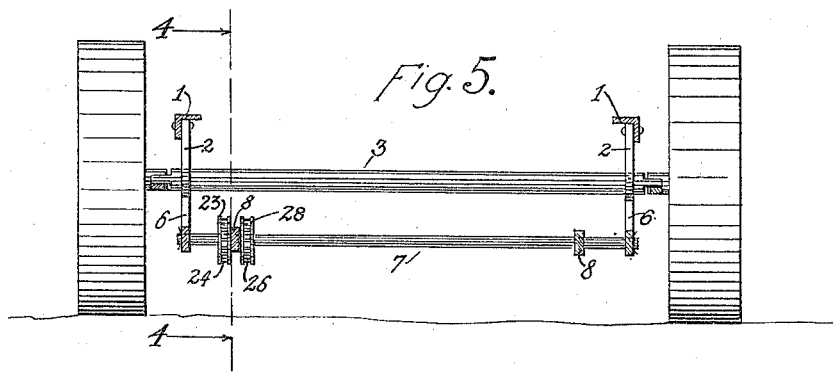

Figure 1 is a plan view of my improved harrow. Fig. 2 is a side view of the same. Fig. 3 is a cross section taken on line 3—3 of Fig. 1. Fig. 4 is a view taken on line 4—4 of Fig. 5. Fig. 5 is a cross section taken on line 5—5 of Fig. 1. Fig. 6 is a longitudinal section through Fig. 7 on line 6—6. Fig. 7 is a sectional view taken on line 7—7 of Fig. 6. Fig. 8 is a sectional view taken on line 8—8 of Fig. 1. Fig. 9 is a section taken on line 9—9 of Fig. 8. Fig. 10 is a plan view of Fig. 11. Fig. 11 is a longitudinal sectional view taken on line 11—11 of Fig. 10. Fig. 12 is a cross section taken on line 12—12 of Fig. 13. Fig. 13 is a front elevation of Fig. 12. Fig. 14 is a section taken on line 14—14 of Fig. 1. Fig. 15 is a sectional view taken on line 15—15 of Fig. 1.

Like reference characters indicate corresponding parts throughout the several views.

The reference numeral 1 designates the frame of the machine which at its front is supported upon braces 2 carried by the stationary front axle 3, and at its rear end is supported upon braces 4 carried by the rotary rear axle 5. To the front end of the frame 1 depending braces 6 are secured that carry the shafts 7 upon which the rocking bars 8 are pivoted, which are provided with a plurality of apertures 9, that carry the adjustable plates 10 which are releasably bolt-connected to said bars and which plates carry the transverse shafts 11 that carry the harrow blades 12. The rocking bars are supported by the relatively forward segmental racks 13 and the rear segmental racks 14, the former being curved more than the latter, which are in mesh, respectively, with gears 15 and 16 carried by the frame 1. Gears 15$^a$ and 16$^a$ are connected by chains 17 which also engage drive gears 18 of a transverse shaft 19 carried by the frame 1 and said shaft is operatively engaged by a lever 20 that works over rack 21 to raise and lower said segmental racks and, with them, said rocking bars and the knife shafts. It is readily seeen that the knife shafts are adjustable individually along the rocker bars and they are also individually adjustable in a vertical plane through the medium of the adjustable plates 10.

Each of the shafts 11 is provided with a terminal gear 22 which gear is rotated by a chain 23 that engages a gear 24 carried by the shaft 7 and that also passes over the pinion 25 carried by the frame 1 and thus it will be seen that rotation of the shaft 7 rotates the harrow blades. Chain 23$^a$ also engages gear 23$^b$ of the knife shafts. Another gear 26 also arranged upon the shaft 7 is connected by chain 28 with a gear 29 which is disposed upon the drive shaft 30 which is further provided with a gear 31 that is driven by chain 32 that engages the large gear 33 of the rear axle 5.

To the rear end of the frame 1 a pair of transverse brace rods 34 are secured, that carry guide bars 34$^a$ and that are formed with integral guides 35 slotted at 36 to receive the pins 37 of sliding bars 38, that slide upon said guide bars 34$^a$, that terminally carry the angular bolts 39 adapted for releasable locking engagement with the lateral supporting racks 40 that carry the transverse shaft 41 of the rake 42, said shaft being further connected by pitmen 43 with the links 44 which are carried by the frame 1. Guide brackets 45 pivoted to the frame at 46 also engage the racks 40 to help retain them in adjusted position. The ends of the bars 38 remote from the bolts 39 are formed with sockets 47 adapted to receive bolts 48 which are provided with springs 49 that abut said bars and a casting 50 which is carried by a bracket 51 connected to the frame 1. The rake, further, is operatively connected to control rods 52 which are connected by the foot bar 53 and thereby raised and lowered while a foot bar 54 operatively associated with the sliding bars 38 serves to retract them against the tension of the springs 49 to withdraw the bolts 39 from engagement with the racks 40 to permit adjustment of said rake. The operator from his seat 55 is in easy reach of the lever that controls the rake and also of the lever that controls the knife shafts.

What is claimed is:—

1. A harrow comprising a wheeled frame, a rake pivotally associated with said frame, racks pivotally connected to said rake, guide brackets for said racks pivotally carried by said wheeled frame, spring-pressed bars associated with said wheeled frame, bolts terminally carried by said spring-pressed bars for releasable engagement with said racks and foot-controlled means connected to said spring-pressed bars for actuating the same to permit adjustment of said racks.

2. A harrow comprising a wheeled frame, a rake pivotally associated with said frame, racks pivotally connected to said rake, guide brackets for said racks pivotally carried by said wheeled frame, spring-pressed bars associated with said wheeled frame, bolts terminally carried by said spring-pressed bars for releasable engagement with said racks, foot-controlled means connected to said spring-pressed bars for actuating the same to permit adjustment of said racks, and foot-controlled bars operatively connected to said racks whereby they are adjusted.

3. A harrow comprising a wheeled frame, a rake pivotally associated with said frame, racks pivotally connected to said rake, guide brackets for said racks pivotally carried by said wheeled frame, foot-pressed means carried by said frame for releasable locking engagement with said racks whereby they are retained in adjusted position and foot-pressed means operatively connected to said rake for adjusting the same with relation to said frame.

4. A harrow comprising a wheeled frame, a rake pivotally associated with said frame, racks pivotally connected to said rake, guide brackets for said racks pivotally carried by said wheeled frame, spring-pressed bars associated with said wheeled frame and bolts terminally carried by said spring-pressed bars for releasable engagement with said racks.

In testimony that I claim the foregoing as my own I have hereto affixed my signature in the presence of two subscribing witnesses.

MATTI OJALA.

Witnesses:
K. WUARI,
H. PENGER.

Copies of this patent may be obtained for five cents each, by addressing the "Commissioner of Patents, Washington, D. C."